United States Patent
Mendoza

[11] 3,720,122
[45] March 13, 1973

[54] APPARATUS TO CONTROL THE CUTTING DEPTH MADE IN A WORKPIECE BY A CUTTING MACHINE

[76] Inventor: Gonzalo R. Mendoza, Avenida Alemania No. 376, Guadalajara, Mexico

[22] Filed: July 20, 1971

[21] Appl. No.: 164,400

[30] Foreign Application Priority Data

Aug. 12, 1970 Mexico..................................124473

[52] U.S. Cl. ..................................82/24 R, 82/34 D
[51] Int. Cl. .............................................B23b 21/00
[58] Field of Search..............................82/24, 34 D

[56] References Cited

UNITED STATES PATENTS

| | | | |
|---|---|---|---|
| 3,221,578 | 12/1965 | Parsons et al. | 82/34 D |
| 2,801,617 | 8/1957 | Lelan | 82/24 X |
| 1,950,039 | 3/1934 | Smith et al. | 82/24 |

Primary Examiner—Leonidas Vlachos
Attorney—Kimmel, Crowell & Weaver

[57] ABSTRACT

In a cutting machine having a cutting tool movable toward and away from a workpiece, an apparatus for automatically changing the depth of cut made by the tool in the workpiece in successive movements of the tool towards the workpiece.

5 Claims, 6 Drawing Figures

APPARATUS TO CONTROL THE CUTTING DEPTH MADE IN A WORKPIECE BY A CUTTING MACHINE

This invention is concerned with a cutting machine wherein a cutting tool is mounted on a tool carrier which is movable towards and away from a workpiece whereby successive cuts are made in the workpiece during successive movements of the tool carrier towards the workpiece. The object of this invention is to so program the machine that during the successive movements of the tool it will automatically penetrate the workpiece different amounts in a prearranged pattern to thereby automatically make successive cuts of different depths.

The foregoing object is attained by providing a body, movable in unison with the tool carrier, having a toothed ratchet movably mounted thereon. A pawl, mounted to the body for movement toward and away from the ratchet, is engageable with the ratchet teeth to prevent movement of the ratchet in a first direction. The pawl is so mounted that, after it is disengaged from a ratchet tooth, it is displaced along the ratchet periphery a prescribed distance in the opposite direction from said first direction that is less than the spacing between the ratchet teeth. When the tool carrier is moved towards the workpiece so as to reach a predetermined location, the ratchet is caused to move in the first direction until the pawl enters the next ratchet tooth, and the tool carrier can move beyond the predetermined location a distance that is proportional to the extent of movement of the ratchet in the first direction.

With reference to said figures, the cutting machine control equipment, in a preferred embodiment, is formed by electric and hydraulical circuits as well as mechanical systems. As will be obvious to those skilled in the art, the electrical circuits and the mechanical circuits are susceptible of a great number of variations so that there are only described those parts which are necessary for an understanding of the invention.

Figure 1:
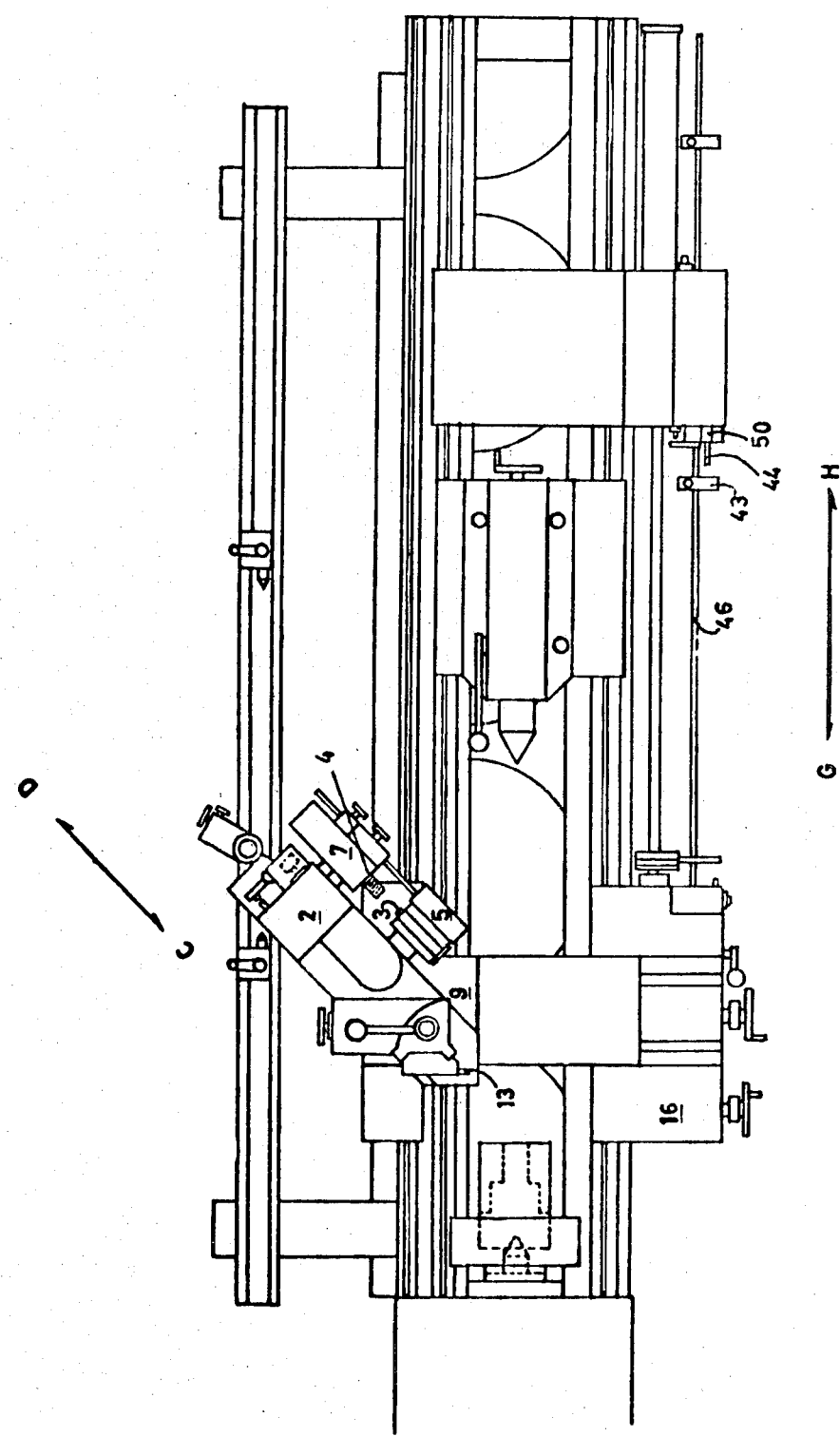
FIG. 1 is a plan view of the machine.
Figure 2:
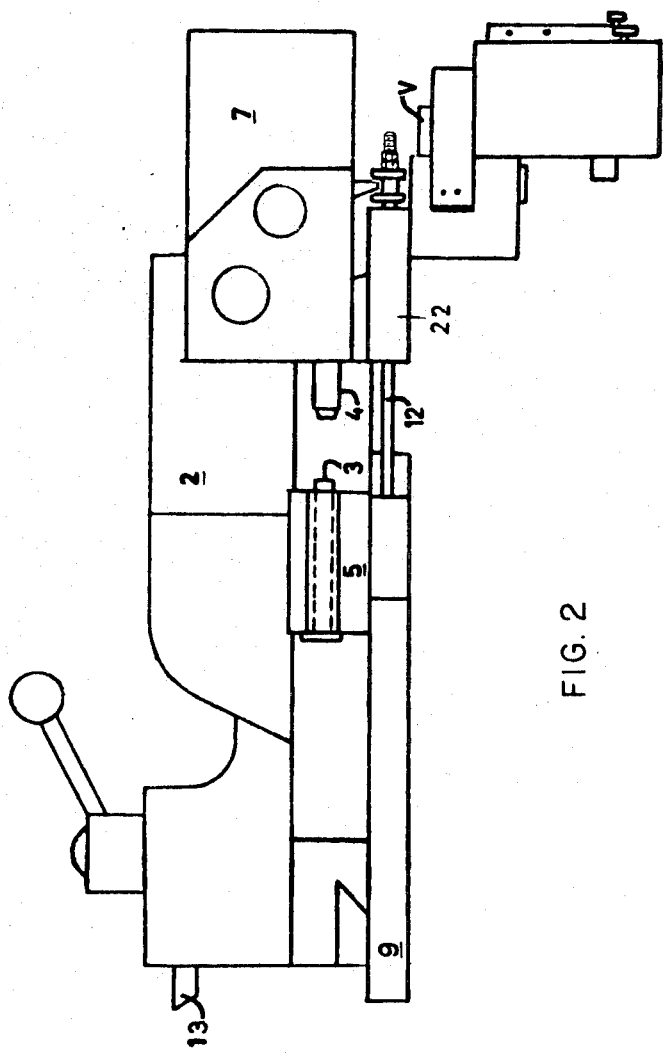
FIG. 2 is a side elevation of the tool carrier and a control mechanism for carrying out the invention.

FIG. 2 shows a body 7 which controls the cutting depth of a tool carrier 2. The tool carrier 2 has a cutting tool 13 mounted thereon and is reciprocable in a path C-D (FIGS. 1 and 4) along a track 9 which is fixed to a carriage 16 (FIG. 1). A rod 12 and a unit 5 are fixed to the track 9. The carriage 16 is reciprocable in a path G-H (FIG. 1).

Figure 3:
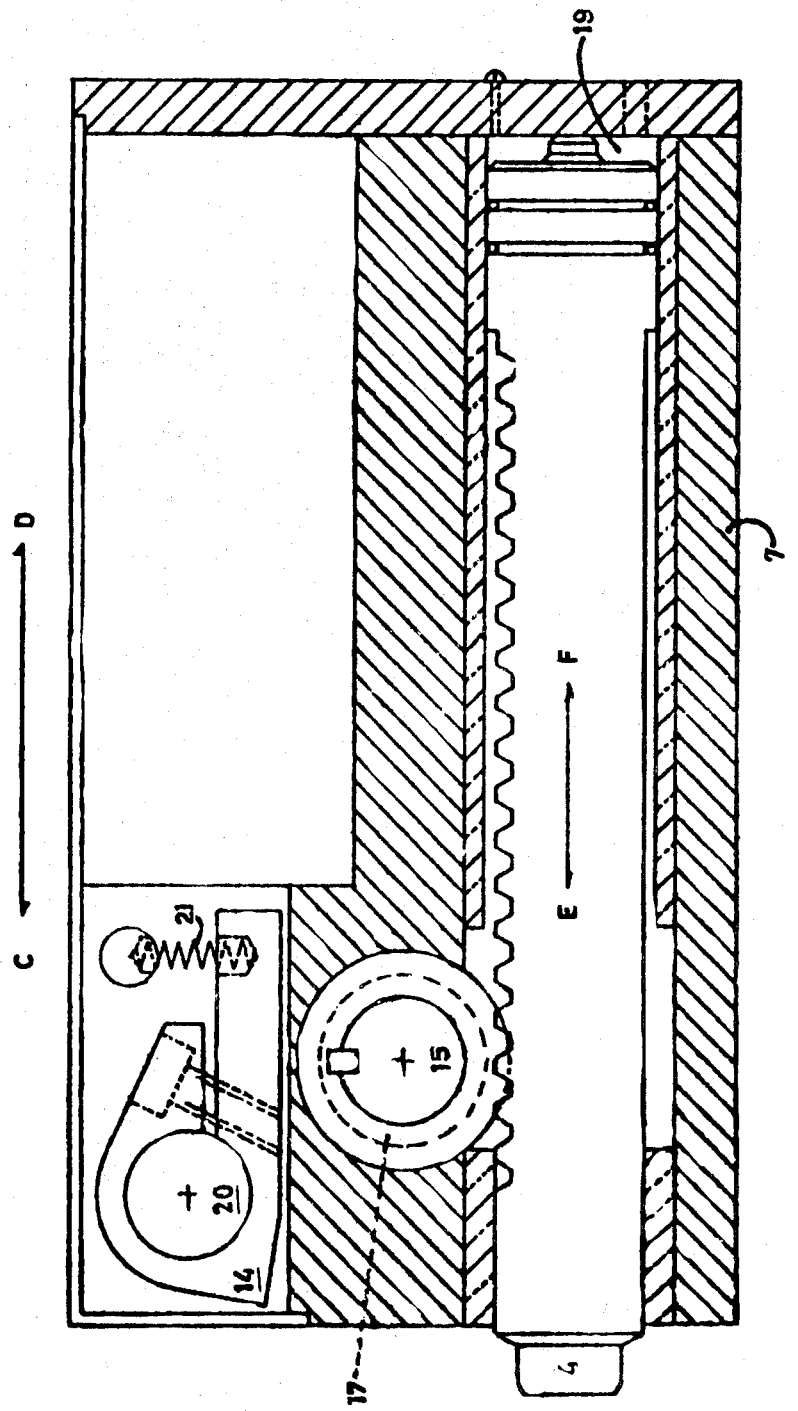
FIG. 3 is a sectional view of a part of the control mechanism.

FIG. 3 shows the disposition of the internal parts which form the apparatus that controls the cutting depth to be made by the cutting tool 13 over a workpiece. This cutting depth apparatus comprises the body 7 and a piston plunger 4, reciprocable in the path E-F, provided with a rack and two packings. Meshing said rack is a gear 17 which is mounted on a shaft 15. The shaft is rotatable in bores made in the body 7. A clamp 14 is mounted on a shaft 20 which is rotatable in bores also made in the body 7.

Figure 4:
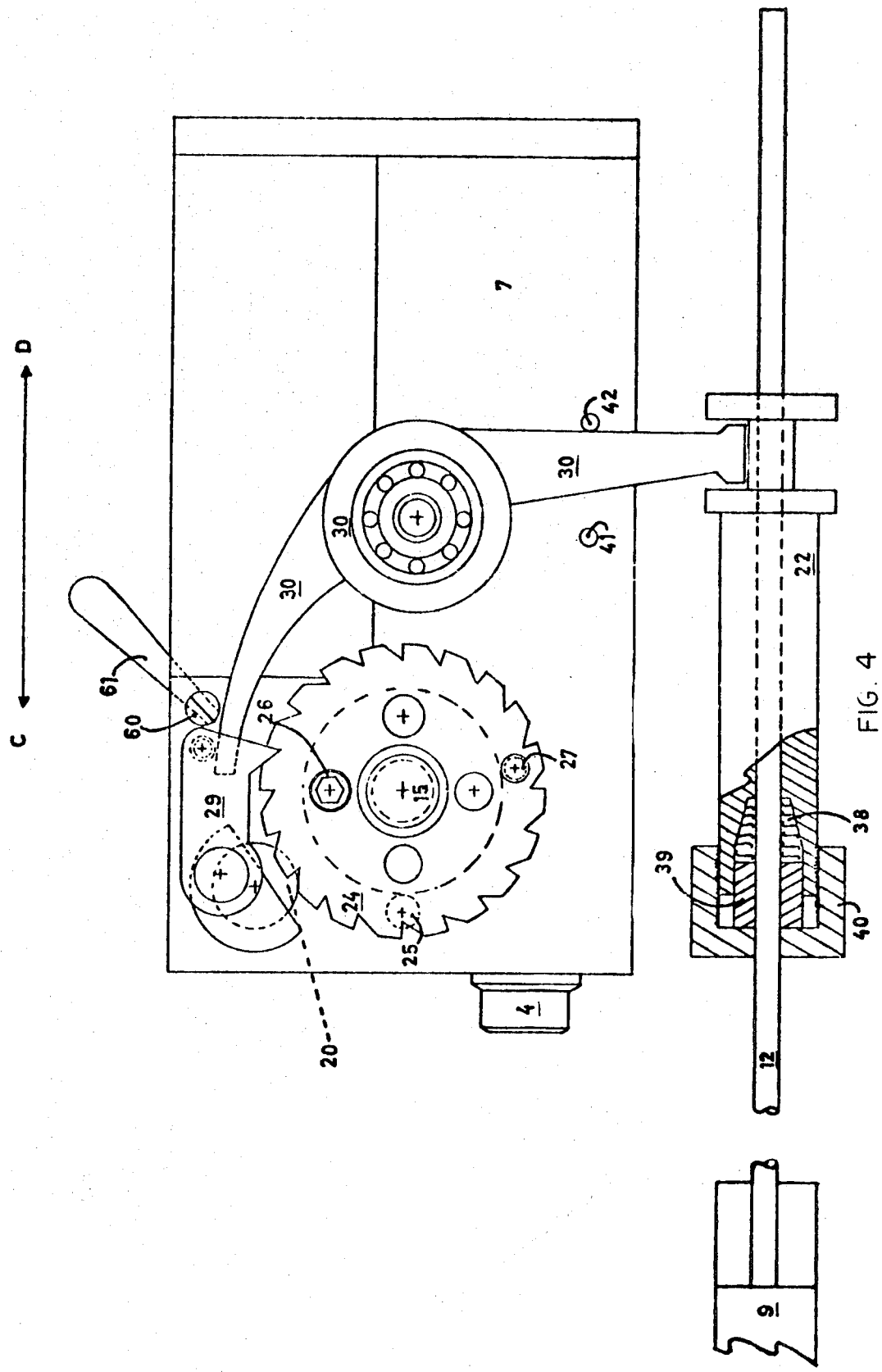
FIG. 4 is a side elevation of the control mechanism.

FIG. 4 shows the position of the external parts of the apparatus which control the cutting depth. In its external end, the shaft 20 has a small eccentric shank which serves as a central pivot to a pawl 29. The shaft 15 has at one end an enlargement in which a screw 26 is fixed. The screw 26 anchors a ratchet 24 to the shaft end by entering any of four bores in said ratchet. A screwhead 27 is fixed in the ratchet 24 with its head on the interior side of the ratchet 24, so that when the ratchet 24 rotates in one way or another, it can do so until the screwhead 27 engages a screwhead 25 that is mounted to the body 7. A lever 30 is mounted to swing about an axis extending through the body 7. The lever, when rotated a little clockwise, lifts the pawl 29, and when rotated counterclockwise allows the pawl 29 to go down. A sleeve 22 is mounted to the rod 12 and has in its interior a friction brake 38, which is pressed by the cap 39 when the threaded cap 40 is rotated. A lever 61, mounted on a shaft 60, serves to prevent movement of the lever 30 when this is desirable.

Figure 5:
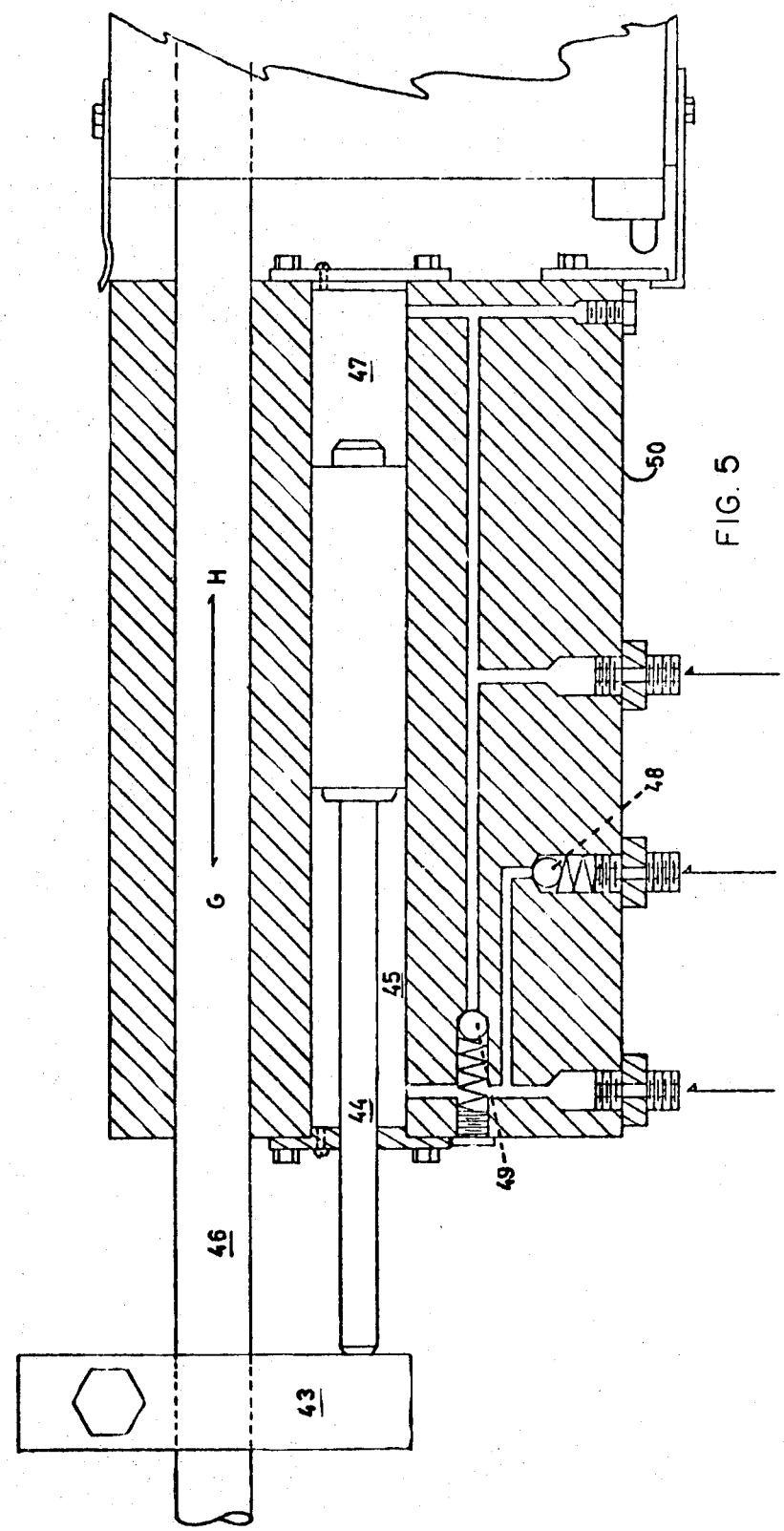
FIG. 5 is a view of a mechanism for controlling the position of a carriage to which the tool carrier is mounted.

FIG. 5 shows a housing 50 having a shaft 46 mounted for movement therethrough in the path G-H, the shaft 46 being fixed to the carriage 16. A collar 43, fixed to the shaft 46, is in alignment with a piston 44, also mounted for movement in the housing 50 in the path G-H. The housing 50 also has, in its interior, flow control valves 48 and 49.

At the beginning of a machining operation, the tool carrier 2 is in the outer position D (FIG. 1), the piston 4 (FIG. 3) is projecting out of the body 7 such that the screwhead 27 engages the bottom of the screwhead 25 (FIG. 4), the pawl 29 is raised out of engagement with the ratchet 24 by the lever 30, the piston 44 is projecting out of the housing 50 and is engaging the collar 43, as indicated in FIG. 5, and the cutting tool 13 is on outer position remote from the workpiece.

The tool carrier 2 is now caused to advance in the direction D-C to make the first cut in the work. This movement causes the lever 30 (FIG. 4) to be swung by the sleeve 22 (which is always braked with a moderate pressure on the rod 12 by the brake 38) to lower the pawl 29 into engagement with the periphery of the ratchet 24 between two of its teeth. Therefore, when the piston engages a stop 3 on the unit 5 that is in alignment with the piston 4 and which is rigid with the track 9, the piston 4 will tend to retract a short distance in the body 7 in the direction E-F and thus rotate the ratchet 24 until the pawl 29 enters one of the teeth of the ratchet 24. After the pawl 29 has entered a ratchet tooth, the piston 4 can no longer move in the direction E-F and the tool carrier can no longer move in the direction D-C so that the cutting tool 13 is now in its final cutting position, having entered the workpiece to a certain depth. This short retraction of the piston 4 causes a small quantity of oil to be expelled from a chamber 19 to the chamber 45 to thereby move the piston 44 a short distance in the direction G-H, this distance being proportional to the relative cross-sectional areas of the pistons 4 and 44.

After the completion of the first cut in the work, the lever 30 is engaging a stop 42 (FIG. 4). Now the tool carrier 2, together with the body 7, is retracted in the direction C-D. At the beginning of the first four or five mm. of this movement, the sleeve 22, which is frictionally held to the shaft 12 by the brake 38, swings the lever 30 counter-clockwise into engagement with a stop 41 to lift the pawl 29 out of the tooth of the ratchet 24 which it had engaged after which the lever 30 drags the sleeve 22 along the shaft 12 against the resistance of the brake 38. When the pawl is raised out of the ratchet tooth, a spring 21 (FIG. 3) rotates the shaft 20 and causes the pawl 29 to be displaced rightwardly (FIG. 4) on the eccentric shank of the shaft 20 a prescribed distance that is less than the distance between any of the adjacent ratchet teeth.

After the tool carrier has been retracted when the first cut is completed, the carriage 16 is moved in the direction G-H until the collar 43 engages the piston 44. As the piston 44 moved a short distance in the direction G-H when the tool carrier 2 was moved inwardly to make the first cut, the carriage can move in the direction G-H an amount sufficient to bring the cutting tool 13 into position for its second cut.

The tool carrier 2 is again caused to move in the direction D-C to make the second cut in the work. This movement again causes the lever 30 to move down against the periphery of the ratchet 24 between ratchet teeth so that when the piston 4 again engages the stop 3 the piston 4 will again move in the direction E-F and thus rotate the ratchet until the pawl 29 enters the next ratchet tooth. The extent of inward movement of the tool carrier beyond the predetermined location determined by the engagement of the piston with the stop 3, and thus the depth of the cut made in the workpiece by the tool 13, is dependent on the distance along the periphery of the ratchet 24 traveled by the pawl 29 before it enters the ratchet tooth, and this is dependent on the peripheral distance between this tooth and the tooth engaged by the pawl for the the first cut. Again the movement of the piston 4 in the direction E-F causes a corresponding movement of the piston 44 in the direction G-H. Therefore, at the beginning of the third cut, after the carriage has 16 been moved again in the direction G-H until the collar 43 engages the piston 44, the carriage will have been moved a distance to place it in position for the third cut. The combined movements of the two pistons 4 and 44 results in the cutting tool always being near the work before each cutting operation.

From the foregoing, it can be seen that the depth of each cut will be proportional to the distance from one tooth to another in the ratchet 24 (FIG. 4). Consequently, if in the machining of one specific workpiece it is needed that the machine make cuts of different depths, it will suffice to provide a ratchet 24 whose distances from one tooth to another is proportional (depending on the position of the cutting tool with respect to the axis of the workpiece to be machined) to the magnitude of the cuts wanted. To obtain a variable scale of cutting depths, there is employed a set of four or five ratchets.

Figure 6:
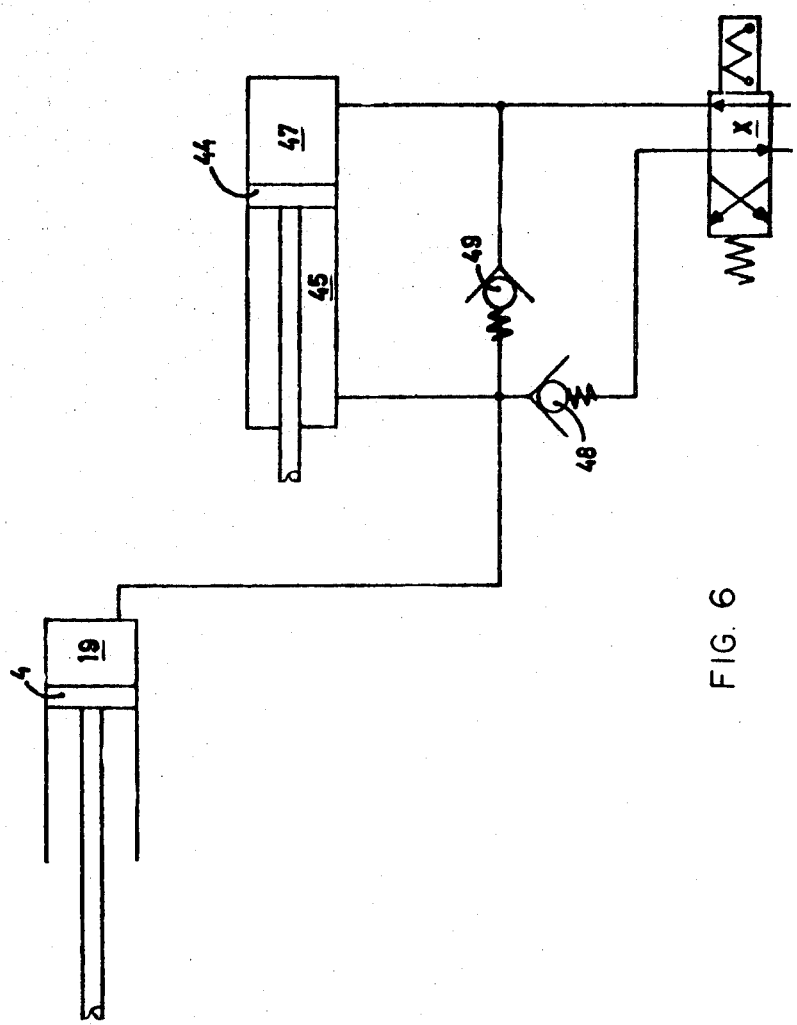
FIG. 6 is a schematic representation of a part of the machine control circuit.

The re-establishment of the initial positions of the pistons 4 and 44, for the next workpiece to be machined, is carried out when the machining of the first workpiece is ended, as follows: An electrically operated valve X (FIG. 6), when energized, allows oil under pressure to pass to a chamber 47, as illustrated in FIG. 6, the piston 44 traveling to the left and impulsing the oil in the chamber 45 to the chamber 19, impulsing this oil, in turn, to move the piston 4 to the left. When the electrovalve X is deenergized (this happens while a workpiece is being machined), the chamber 47 stays connected with the source of oil and the oil under pressure is forced past flow control valve 48, thus preventing the leakage of the oil contained between the chambers 19 and 45 during the machining operation. The function of the flow control valve 49 is to allow, at each cycle end, the re-establishment of the hydraulic fluid contained between the pistons 4 and 44 if there were some leakage; whilst the function of the flow control valve 48 is to allow the leakage of the hydraulic fluid contained between the pistons 4 and 44 when it is desired to reduce the amount of movement of the piston 4, said movement depending on the bore in which the ratchet 24 has been anchored (FIG. 4) by the screwhead 26 fixed to the shaft 15. This is because the ratchet 24 can rotate clockwise to project piston 4 out of the body 7 only until the screwhead 27 fixed to the ratchet 24 engages the screwhead 25 fixed to the body 7 for the control of the cutting depth. In small workpieces the whole range of movement of the piston 4 in the direction F-E (FIG. 3) is not needed. Thus, in the machining of said workpieces the tool carrier 2 may work in the front part of the track 9, there being greater bearing surface in said part of the track.

I claim:
1. An apparatus for controlling the cutting depth made by a cutting machine in a workpiece comprising: a tool carrier, mounting a cutting tool, movable in a path that extends towards and away from the workpiece; a body mounted for movement in unison with the tool carrier; a ratchet, having a plurality of spaced teeth on its periphery, movably mounted in the body; a pawl mounted to the body for movement toward and away from the ratchet periphery and adapted to prevent movement of the ratchet in a first direction when it is in engagement with a ratchet tooth; means for displacing the pawl along the ratchet periphery in the opposite direction from said first direction a prescribed distance that is less than the spacing between the ratchet teeth pursuant to the movement of the pawl out of a ratchet tooth; means for effecting inward movement of the tool carrier towards a predetermined location; means for causing the pawl to be urged towards the ratchet periphery said prescribed distance from a first ratchet tooth when the tool carrier arrives at said location; ratchet operating means responsive to the arrival of the tool carrier at said location to cause the ratchet to move in said first direction until the pawl enters the next ratchet tooth; means operative to continue the inward movement of the tool carrier beyond said location a distance that is proportional to the extent of said movement of the ratchet in said first direction; and means effective to terminate the inward movement of the tool carrier in response to the entrance of the pawl into said next ratchet tooth.

2. The apparatus as defined in claim 1 wherein said ratchet operating means comprises: a plunger movably mounted in the body; motion transmitting means interposed between the plunger and the ratchet; and a stop positioned at said location in alignment with the plunger, whereby the engagement of the plunger with the stop at said location will cause the plunger to move in the body until the pawl enters said next ratchet tooth.

3. The apparatus as defined in claim 2 further comprising: a carriage movable in a second path that is transverse to the path of movement of the tool carrier; a housing; a piston movably mounted in the housing; positioning means for positioning the carriage in said second path in a position that is determined by the location of the piston in the housing; and means, responsive to the movement of the plunger in the body, to cause corresponding movement of the piston in the housing.

4. The apparatus as defined in claim 3 wherein the last mentioned means comprises: hydraulic circuit means interposed between the plunger and the piston; and flow control valves to control the flow of fluid in said hydraulic circuit means.

5. The apparatus as defined in claim 1 wherein the pawl is mounted to a lever that is pivoted to the body to provide the mounting of the pawl to the body; and further comprising: a friction device engageable with the lever; means responsive to the movement of the tool carrier towards the workpiece to cause the friction device to so swing the lever that the pawl is urged towards the ratchet periphery; and means responsive to the movement of the tool carrier away from the workpiece to cause the friction device to so swing the lever that the pawl is moved out of a ratchet tooth.

* * * * *